US009232061B2

(12) United States Patent
Savaglio et al.

(10) Patent No.: US 9,232,061 B2
(45) Date of Patent: *Jan. 5, 2016

(54) METHOD OF PROVIDING 911 SERVICE TO A PRIVATE BRANCH EXCHANGE

(71) Applicant: AT&T Intellectual Property I, L.P., Atlanta, GA (US)

(72) Inventors: John Joseph Savaglio, Oak Lawn, IL (US); Richard Bruce Fowler, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/067,470

(22) Filed: Oct. 30, 2013

(65) Prior Publication Data

US 2014/0056416 A1 Feb. 27, 2014

Related U.S. Application Data

(63) Continuation of application No. 13/149,499, filed on May 31, 2011, now Pat. No. 8,600,010, which is a continuation of application No. 12/251,238, filed on Oct. 14, 2008, now Pat. No. 7,974,389, which is a (Continued)

(51) Int. Cl.
*H04M 11/00* (2006.01)
*H04M 3/51* (2006.01)
(Continued)

(52) U.S. Cl.
CPC ........ *H04M 3/5116* (2013.01); *H04M 3/42314* (2013.01); *H04M 3/51* (2013.01); *H04M 3/42042* (2013.01); *H04M 3/42059* (2013.01); *H04M 7/009* (2013.01); *H04M 2207/12* (2013.01); *H04M 2242/04* (2013.01);
(Continued)

(58) Field of Classification Search
CPC ..................... H04M 2242/04; H04M 2242/14; H04M 7/009; H04M 3/42314; H04M 3/51; H04M 2242/30; H04M 3/5116
USPC .......................................................... 379/45
See application file for complete search history.

(56) References Cited

U.S. PATENT DOCUMENTS

| 4,310,726 A | 1/1982 | Asmuth |
| 4,488,004 A | 12/1984 | Bogart et al. |
| 4,611,096 A | 9/1986 | Asmuth et al. |

(Continued)

FOREIGN PATENT DOCUMENTS

| EP | 0553754 | 8/1993 |
| JP | 62116056 | 5/1987 |

(Continued)

OTHER PUBLICATIONS

United States Patent and Trademark Office, "Advisory Action," issued in U.S. Appl. No. 11/037,524, mailed Dec. 6, 2005, 3 pages.

(Continued)

*Primary Examiner* — Stella L Woo
(74) *Attorney, Agent, or Firm* — Hanley, Flight & Zimmerman, LLC

(57) ABSTRACT

A method of providing 911 service to a private branch exchange, includes grouping a plurality of private telephone numbers into a set. An outgoing telephone line for a 911 call is assigned to the set. A location information for the outgoing telephone line is input into a location database.

20 Claims, 4 Drawing Sheets

Related U.S. Application Data continuation of application No. 11/037,524, filed on Jan. 18, 2005, now Pat. No. 7,436,938, which is a continuation of application No. 10/635,132, filed on Aug. 6, 2003, now Pat. No. 6,950,499, which is a continuation of application No. 10/278,602, filed on Oct. 23, 2002, now Pat. No. 6,650,733, which is a continuation of application No. 10/093,749, filed on Mar. 8, 2002, now Pat. No. 6,501,831, which is a continuation of application No. 09/642,430, filed on Aug. 21, 2000, now Pat. No. 6,415,019.

(51) Int. Cl.
H04M 3/42 (2006.01)
H04M 7/00 (2006.01)

(52) U.S. Cl.
CPC ....... *H04M2242/14* (2013.01); *H04M 2242/22* (2013.01); *H04M 2242/30* (2013.01)

(56) References Cited

U.S. PATENT DOCUMENTS

| | | |
|---|---|---|
| 5,161,180 A | 11/1992 | Chavous |
| 5,235,630 A | 8/1993 | Moody et al. |
| 5,339,351 A | 8/1994 | Hoskinson et al. |
| 5,347,567 A | 9/1994 | Moody et al. |
| 5,347,568 A | 9/1994 | Moody et al. |
| 5,422,943 A | 6/1995 | Cooney et al. |
| 5,579,368 A | 11/1996 | van Berkum |
| 5,646,985 A | 7/1997 | Andruska et al. |
| 5,818,921 A | 10/1998 | Vander Meiden et al. |
| 5,974,133 A | 10/1999 | Fleischer, III et al. |
| 6,243,442 B1 | 6/2001 | Tanaka et al. |
| 6,266,397 B1 | 7/2001 | Stoner |
| 6,415,019 B1 | 7/2002 | Savaglio et al. |
| 6,501,831 B2 | 12/2002 | Savaglio et al. |
| 6,567,514 B2 | 5/2003 | Fleischer, III et al. |
| 6,650,733 B2 | 11/2003 | Savaglio et al. |
| 6,711,247 B1 | 3/2004 | Needham et al. |
| 6,804,329 B2 | 10/2004 | Geck et al. |
| 6,854,094 B2 | 2/2005 | Inui et al. |
| 6,950,499 B2 | 9/2005 | Savaglio et al. |
| 7,116,775 B2 | 10/2006 | Lee |
| 7,436,938 B2 | 10/2008 | Savaglio et al. |
| 7,974,389 B2 | 7/2011 | Savaglio et al. |
| 8,600,010 B2 * | 12/2013 | Savaglio et al. ........... 379/45 |

FOREIGN PATENT DOCUMENTS

| | | |
|---|---|---|
| JP | 3106194 | 5/1991 |
| JP | 6217043 | 8/1994 |
| JP | 20000069512 | 3/2000 |
| JP | 2001320749 | 11/2001 |

OTHER PUBLICATIONS

United States Patent and Trademark Office, "Office Action," issued in U.S. Appl. No. 11/037,524, mailed Jan. 11, 2006, 7 pages.
United States Patent and Trademark Office, "Office Action," issued in U.S. Appl. No. 11/037,524, mailed Sep. 28, 2007, 5 pages.
United States Patent and Trademark Office, "Office Action," issued in U.S. Appl. No. 11/037,524, mailed Jan. 2, 2008, 5 pages.
United States Patent and Trademark Office, "Notice of Allowance," issued in U.S. Appl. No. 11/037,524, mailed Jun. 27, 2008, 4 pages.
United States Patent and Trademark Office, "Office Action," issued in U.S. Appl. No. 10/635,132, mailed Jul. 15, 2004, 5 pages.
United States Patent and Trademark Office, "Notice of Allowance," issued in U.S. Appl. No. 10/635,132, mailed Nov. 24, 2004, 3 pages.
United States Patent and Trademark Office, "Notice of Allowance," issued in U.S. Appl. No. 09/642,430, mailed Feb. 1, 2002, 3 pages.
United States Patent and Trademark Office, "Notice of Allowance," issued in U.S. Appl. No. 10/278,602, mailed Jul. 10, 2003, 4 pages.
United States Patent and Trademark Office, "Office Action," issued in U.S. Appl. No. 10/278,602, mailed May 27, 2003, 7 pages.
United States Patent and Trademark Office, "Office Action," issued in U.S. Appl. No. 10/278,602, mailed Apr. 8, 2003, 4 pages.
United States Patent and Trademark Office, "Notice of Allowance," issued in U.S. Appl. No. 10/093,749, mailed Aug. 26, 2002, 4 pages.
United States Patent and Trademark Office, "Office Action," issued in U.S. Appl. No. 10/093,749, mailed Jun. 3, 2002, 5 pages.
United States Patent and Trademark Office, "Office Action," issued in U.S. Appl. No. 11/037,524, mailed Sep. 30, 2005, 6 pages.
United States Patent and Trademark Office, "Notice of Allowance," issued in U.S. Appl. No. 12/251,238, mailed Apr. 18, 2011, 5 pages.
United States Patent and Trademark Office, "Office Action," issued in U.S. Appl. No. 12/251,238, mailed Jan. 5, 2011, 6 pages.
United States Patent and Trademark Office, "Office Action," issued in U.S. Appl. No. 13/149,499, mailed Apr. 10, 2013, 16 pages.
United States Patent and Trademark Office, "Notice of Allowance," issued in U.S. Appl. No. 13/149,499, mailed Jul. 29, 2013, 12 pages.
Motorola, "Guide to Understanding 3-1-1 Systems," Sep., 2002, 8 pages.
Xtend Communications Corp., "Who Dialed 911? A look at the issues surrounding Enhanced 911," Copyright 2003 Xtend Communications Corp., 4 pages.
"PBX Vulnerability Analysis, Finding Holes in Your PBX Before Someone Else Does," Special Publication 800-24, United States Department of Commerce, National Institute of Standards and Technology, Aug. 2000, 66 pages.

* cited by examiner

METHOD OF PROVIDING 911 SERVICE TO A PRIVATE BRANCH EXCHANGE

RELATED APPLICATIONS

This patent arises from a continuation of U.S. patent application Ser. No. 13/149,499, filed May 31, 2011, now U.S. Pat. No. 8,600,010, which is a continuation of U.S. patent application Ser. No. 12/251,238, filed Oct. 14, 2008, now U.S. Pat. No. 7,974,389, which is a continuation of U.S. patent application Ser. No. 11/037,524, filed Jan. 18, 2005, now U.S. Pat. No. 7,436,938, which is a continuation of U.S. patent application Ser. No. 10/635,132, filed Aug. 6, 2003, now U.S. Pat. No. 6,950,499, which is a continuation of U.S. patent application Ser. No. 10/278,602, filed Oct. 23, 2002, now U.S. Pat. No. 6,650,733, which is a continuation of U.S. patent application Ser. No. 10/093,749, filed Mar. 8, 2002, now U.S. Pat. No. 6,501,831, which is a continuation of U.S. patent application Ser. No. 09/642,430, filed Aug. 21, 2000, now U.S. Pat. No. 6,415,019, which are hereby incorporated herein by reference in their entireties.

FIELD OF THE DISCLOSURE

The present invention relates to generally to the field of 911 emergency service systems and more particularly to a method of providing 911 service to a private branch exchange.

BACKGROUND

A Public Safety Answering Point (PSAP) uses an automatic location identification (ALI) information provided with the automatic number identification (ANI) to determine the location of a 911 telephone call. Unfortunately, when a 911 call is placed from a business having a PBX (Private Branch Exchange), the PSAP only receives the billing address of the business. For large businesses having multiple locations, this does not provide any useful information. Some PBX providers allow the owners to enter in correct location information for all their lines. Unfortunately, this is time consuming and therefor rarely is done.

Thus there exists a need for a method of providing 911 service to a private telephone numbering system that is easy to setup.

DETAILED DESCRIPTION OF THE DRAWINGS

A method of providing 911 service to a private branch exchange, includes grouping a plurality of private telephone numbers into a set. An outgoing telephone line for a 911 call is assigned to the set. A location information for the outgoing telephone line is input into a location database (E911 database). By grouping the telephone lines significantly less information has to be input into the location database. The groups are selected to be telephone lines in a set geographic area. For instance all the telephones on the third floor of a small building might be grouped together. This provides emergency personnel with plenty of information to locate the emergency.

Figure 1:
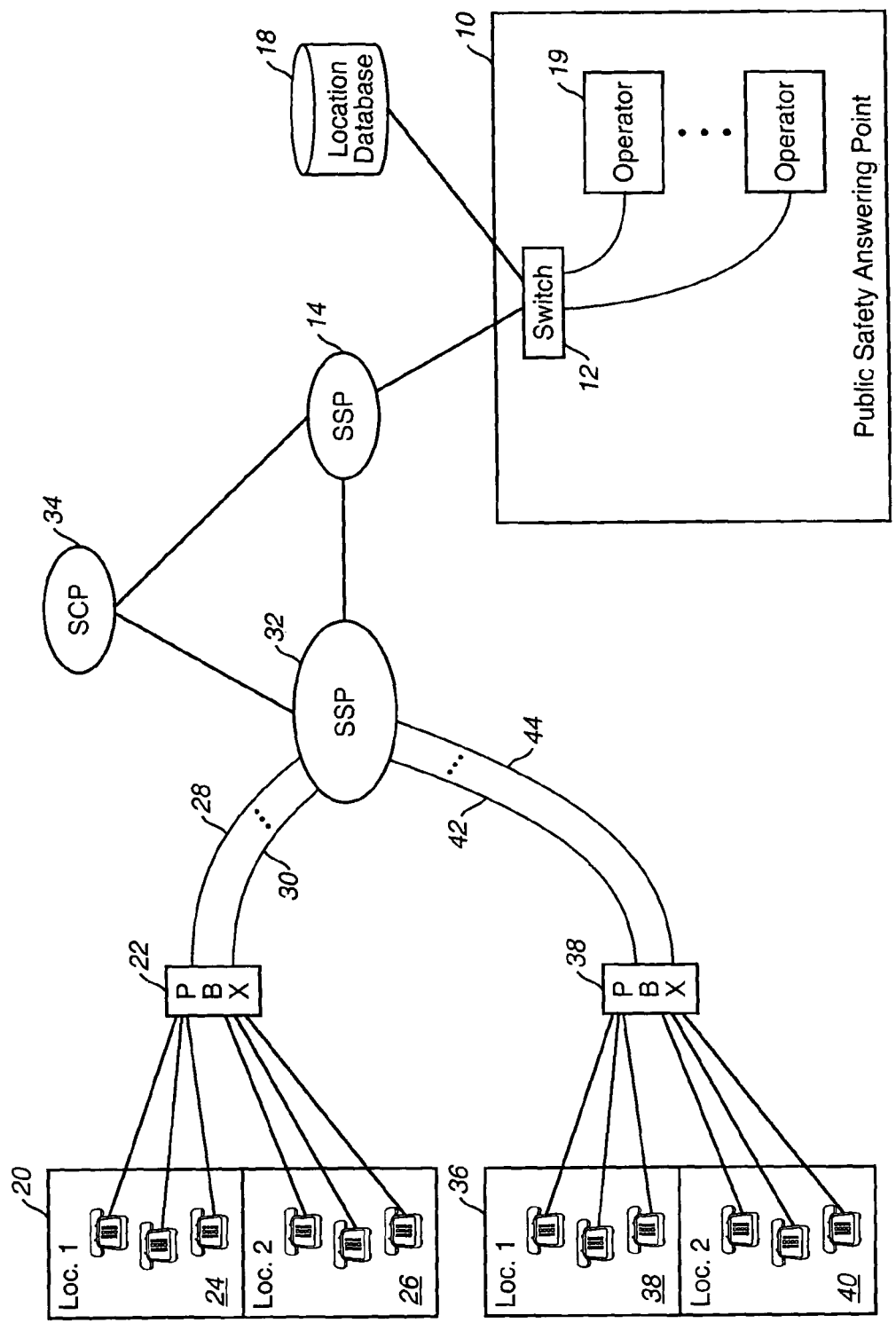
FIG. 1 is a block diagram of public safety answering service for a private telephone numbering system in accordance with one embodiment of the invention.

FIG. 1 is a block diagram of public safety answering service for a private branch exchange in accordance with one embodiment of the invention. A public safety answering point (PSAP) 10 includes a switch 12 connected to a SSP (Service Switching Point) 14. The switch 12 triggers on incoming call and forms a location query. The location query is set to a location database (E911 database) 16. The call and location information are forwarded to one of a plurality of operators 19.

A company 20 using a PBX 22 groups private telephone lines according to their location. This company 20 has two locations 24, 26. Any 911 call from the first location 24 is routed over a predetermined public telephone line 28. Any 911 call from the second location 26 is routed over a predetermined public telephone line 30. The PBX 22 is connected to a SSP 32. A 911 call is then sent to SSP 14 and to the PSAP 10. A SCP (Service Control Point) 34 is connected through an intelligent network to the SSPs 14, 32. The SCP 34 may provide routing information to the SSP 32 for 911 calls. A second company 36 also has a PBX 38. The company 36 also divides its telephones into two locations 38, 40. Note that any number of locations could be handled and the invention encompasses more than a single PBX. A 911 call from any of the telephones in the first location 38 are routed over a predetermined external telephone line 42. A 911 call from any of the telephones in the second location 40 are routed over a predetermined external telephone line 44.

Figure 2:
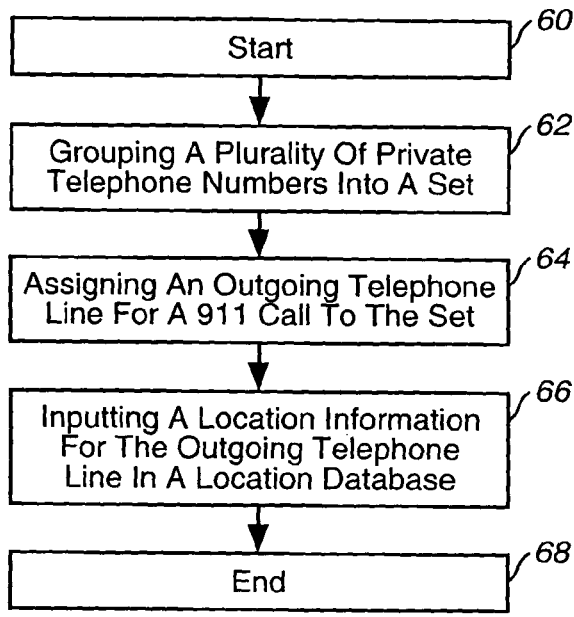
FIG. 2 is a flow chart of the steps used in a method of providing 911 service to a private branch exchange in accordance with one embodiment of the invention.

FIG. 2 is a flow chart of the steps used in a method of providing 911 service to a private branch exchange in accordance with one embodiment of the invention. The process start, step 60, by grouping a plurality of telephone numbers into a set at step 62. An outgoing telephone line for a 911 call is assigned to the set at step 64. At step 66, a location information for the outgoing telephone line is input into a location database of a telephone company which ends the process at step 68. In one embodiment, the plurality of private telephone numbers are selected by an origination location. In one embodiment a private branch exchange is programmed to select the outgoing telephone line when a 911 call is received from one of the plurality of private telephone numbers.

In one embodiment when the 911 call is dialed from one of the plurality of, private telephone numbers, the 911 call is sent out over the outgoing telephone line. The 911 call is triggered on at a service switching point. A routing query is transmitted to a switching control point (SCP). A routing instruction is received from the SCP. The 911 call is routed to a proper PSAP. A location database is queried for a location associated with a telephone number of the outgoing telephone line.

Figure 3:
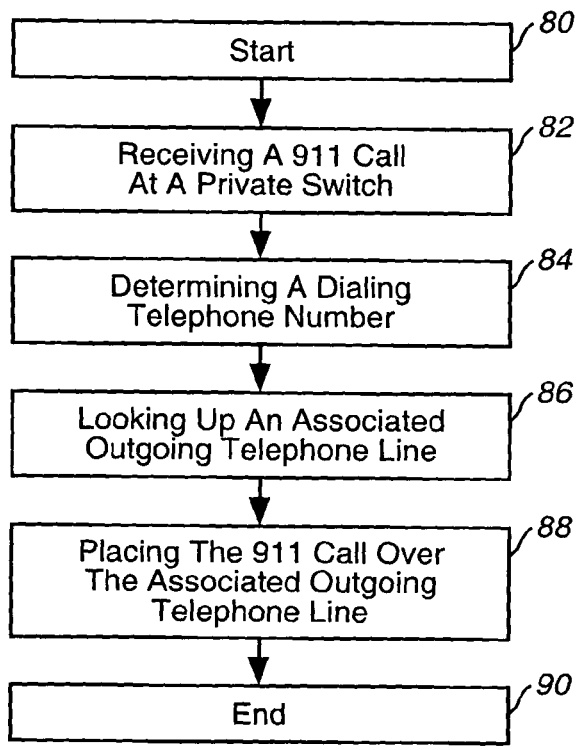
FIG. 3 is a flow chart of the steps used in a method of providing 911 service to a private branch exchange in accordance with one embodiment of the invention.

FIG. 3 is a flow chart of the steps used in a method of providing 911 service to a private branch exchange in accordance with one embodiment of the invention. The process starts, step 80, by receiving a 911 call at a private switch at step 82. In one embodiment, the private switch is a private branch exchange. A dialing telephone number is determined at step 84. An associated outgoing telephone line is looked up at step 86. At step 88, the 911 call is placed over the associated outgoing telephone line which ends the process at step 90. The 911 call is received at a service switching point (SSP). The 911 call is triggered on and the SSP sends a query to a switching control point (SCP). A response is received that includes a routing instruction. In one embodiment the response includes the number of the associated outgoing telephone line. The 911 call is routed to a public safety answering point (PSAP). A location query is sent to a location database. The 911 call is forwarded to an operator. A location information is transmitted to the operator.

In one embodiment, a first plurality of private telephone numbers are grouped into a first set. A second plurality of private telephone numbers are grouped into a second set. One of a plurality of outgoing telephone lines is assigned to the first set. A second of the plurality of outgoing telephone lines is assigned to the second set. The location database is programmed to include a location for the one of the plurality of outgoing telephone lines and a second location for the second of the plurality of outgoing telephone lines.

Figure 4:
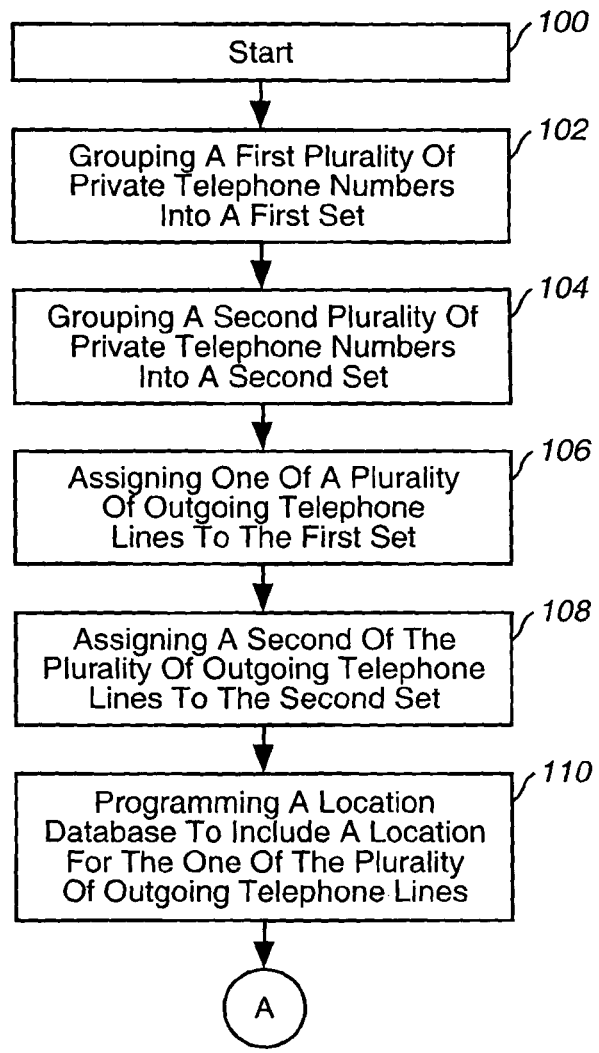
FIGS. 4 & 5 are a flow chart of the steps used in a method of providing 911 service to a private branch exchange in accordance with one embodiment of the invention.
Figure 5:
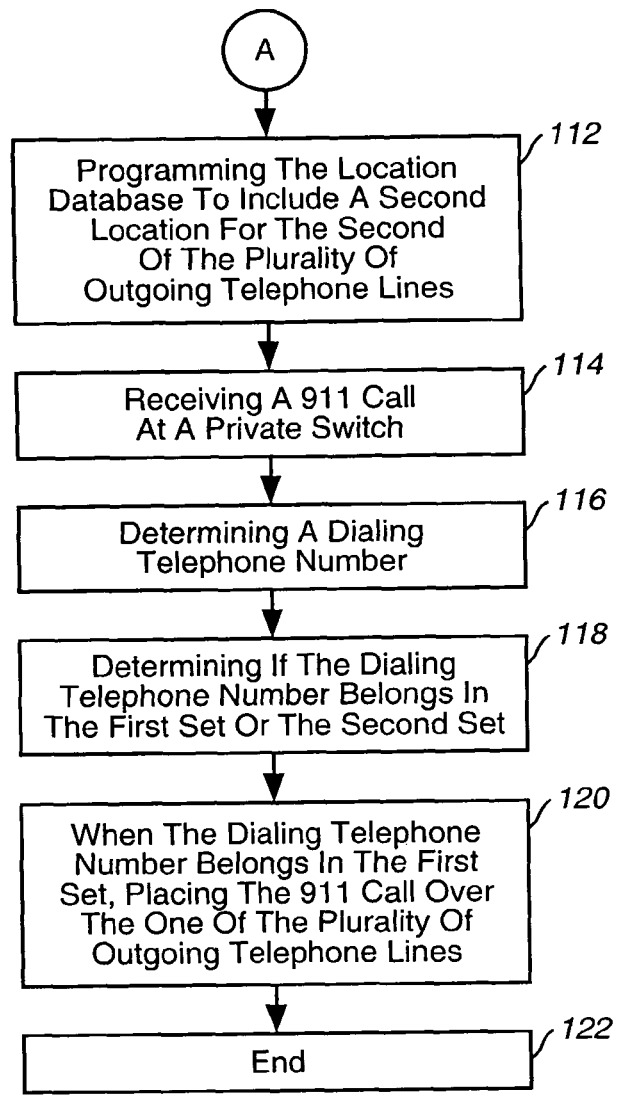

FIGS. 4 & 5 are a flow chart of the steps used in a method of providing 911 service to a private branch exchange in accordance with one embodiment of the invention. The process starts, step 100, by grouping a first plurality of private telephone numbers into a first set at step 102. A second plurality of private telephone numbers is grouped into a second set at step 104. One of a plurality of outgoing telephone lines is assigned to the first set at step 106. A second of the plurality of outgoing telephone lines is assigned to the second set at step 108. A location database is programmed to include a location for the one of the plurality of outgoing telephone lines at step 110. The location database is programmed to include a second location for the second of the plurality of outgoing telephone lines at step 112. A 911 call is received at a private switch at step 114. A dialing telephone number is determined at step 116. At step 118 it is determined if the dialing telephone number belongs in the first set or the second set. When the dialing telephone number belongs in the first set at step 120, the 911 call is placed over the one of the plurality of outgoing telephone lines which ends the process at step 122. When the dialing telephone number belongs in the second set, the 911 call is placed over the second of the plurality of outgoing telephone lines. The 911 call is received at a service switch point. The 911 call is triggered on and a query is sent to a switching control point. A response is received that includes a routing instruction. The 911 call is routed to a public safety answering point. A location query is sent to the location database. The call is forwarded to an operator. A location information is transmitted to the operator.

Thus there has been described a method of providing 911 service to a private telephone numbering system that is easy to setup.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method, comprising:
   in response to receiving a first emergency call at a private branch exchange from a first device having a first number belonging to a first group of numbers that are grouped based on a first shared origination location, selecting, via a logic circuit at the private branch exchange, a first outgoing telephone line assigned to the first group of numbers for the first emergency call, wherein a public safety answering point to which the first emergency call is directed identifies the first shared origination location based on receiving the first emergency call from the first outgoing telephone line; and
   in response to receiving a second emergency call at the private branch exchange from a second device having a second number belonging to a second group of numbers that are grouped based on a second shared origination location, selecting, via the logic circuit, a second outgoing telephone line assigned to the second group of numbers for the second emergency call, wherein the public safety answering point to which the second emergency call is directed identifies the second shared origination location based on receiving the second emergency call from the second outgoing telephone line.

2. The method as defined in claim 1, further including identifying the first number as a dialing telephone number of the first emergency call.

3. The method as defined in claim 1, further including populating a lookup data structure with an association between the first shared origination location and the first outgoing telephone line.

4. The method as defined in claim 3, wherein the lookup data structure is queried to identify the first shared origination location based on the first emergency call being placed over the first outgoing telephone line.

5. The method as defined in claim 1, wherein the first shared origination location is a first floor of a building and the second shared origination location is a second floor of the building, the second floor being different than the first floor.

6. The method as defined in claim 1, wherein the first and second groups of numbers are associated with a same entity, and the first shared origination location is different from the second shared origination location.

7. The method as defined in claim 1, wherein the first shared origination location is a first geographic area and the second shared origination location is a second geographic area, the second geographic area being different than the first geographic area.

8. A tangible machine readable storage device including instructions which, when executed, cause a machine to perform operations comprising:
   in response to receiving a first emergency call at a private branch exchange from a first device having a first number belonging to a first group of numbers that are grouped based on a first shared origination location, selecting a first outgoing telephone line assigned to the first group of numbers for the first emergency call, a public safety answering point to which the first emergency call is directed to identify the first shared origination location based on receiving the first emergency call from the first outgoing telephone line; and
   in response to receiving a second emergency call at the private branch exchange from a second device having a second number belonging to a second group of numbers that are grouped based on a second shared origination location, selecting a second outgoing telephone line assigned to the second group of numbers for the second emergency call, the public safety answering point to which the first emergency call is directed to identify the second shared origination location based on receiving the second emergency call from the second outgoing telephone line.

9. The storage device as defined in claim 8, wherein the operations further include identifying the first number as a dialing telephone number of the first emergency call.

10. The storage device as defined in claim 8, wherein the operations further include populating a lookup data structure with an association between the first shared origination location and the first outgoing telephone line.

11. The storage device as defined in claim 10, wherein the lookup data structure is queried to identify the first shared origination location based on the first emergency call being placed over the first outgoing telephone line.

12. The storage device as defined in claim 8, wherein the first shared origination location is a first floor of a building and the second shared origination location is a second floor of the building, the second floor being different than the first floor.

13. The storage device as defined in claim 8, wherein the first and second groups of numbers are associated with a same entity, and the first shared origination location is different from the second shared origination location.

14. The storage device as defined in claim 8, wherein the first shared origination location is a first geographic area and the second shared origination location is a second geographic area, the second geographic area being different than the first geographic area.

15. An apparatus, comprising:
memory including machine readable instructions; and
a processor which, when executing the instructions, performs operations including:
in response to receiving a first emergency call at a private branch exchange from a first device having a first number belonging to a first group of numbers that are grouped based on a first shared origination location, selecting a first outgoing telephone line assigned to the first group of numbers for the first emergency call, a public safety answering point to which the first emergency call is directed to identify the first shared origination location based on the first emergency call being received from the first outgoing telephone line; and
in response to receiving a second emergency call at the private branch exchange from a second device having a second number belonging to a second group of numbers that are grouped based on a second shared origination location, selecting a second outgoing telephone line assigned to the second group of numbers for the second emergency call, the public safety answering point to which the second emergency call is directed to identify the second shared origination location based on receiving the second emergency call being received from the second outgoing telephone line.

16. The apparatus as defined in claim 15, wherein the operations further include identifying the first number as a dialing telephone number of the first emergency call.

17. The apparatus as defined in claim 15, wherein the operations further include populating a lookup data structure with an association between the first shared origination location and the first outgoing telephone line.

18. The apparatus as defined in claim 17, wherein the lookup data structure is queried to identify the first shared origination location based on the first emergency call being placed over the first outgoing telephone line.

19. The apparatus as defined in claim 15, wherein the first shared origination location is a first floor of a building and the second shared origination location is a second floor of the building, the second floor being different than the first floor.

20. The apparatus as defined in claim 15, wherein the first shared origination location is a first geographic area and the second shared origination location is a second geographic area, the second geographic area being different than the first geographic area.

* * * * *